(12) United States Patent
Yang

(10) Patent No.: US 9,817,448 B2
(45) Date of Patent: Nov. 14, 2017

(54) HOT SWAP SYSTEM AND ELECTRONIC DEVICE UTILIZING THE SAME

(71) Applicant: MiiCs & Partners (Shenzhen) Co., Ltd., Shenzhen (CN)

(72) Inventor: Meng-Liang Yang, Shenzhen (CN)

(73) Assignee: MiiCs & Partners (Shenzhen) Co., Ltd., Shenzhen (CN)

( * ) Notice: Subject to any disclaimer, the term of this patent is extended or adjusted under 35 U.S.C. 154(b) by 102 days.

(21) Appl. No.: 14/804,839

(22) Filed: Jul. 21, 2015

(65) Prior Publication Data
US 2017/0027078 A1    Jan. 26, 2017

(51) Int. Cl.
G06F 13/00 (2006.01)
G06F 13/38 (2006.01)
G06F 1/18 (2006.01)

(52) U.S. Cl.
CPC ...................... *G06F 1/18* (2013.01)

(58) Field of Classification Search
None
See application file for complete search history.

(56) References Cited

U.S. PATENT DOCUMENTS

| | | | | |
|---|---|---|---|---|
| 5,910,690 A * | 6/1999 | Dorsey | ............... | G06F 13/4081 307/141 |
| 6,401,157 B1 * | 6/2002 | Nguyen | ............... | G06F 13/4081 710/302 |
| 2002/0129186 A1 * | 9/2002 | Emerson | ............. | G06F 13/4081 710/302 |
| 2005/0193159 A1 * | 9/2005 | Ng | ............. | G06F 1/26 710/302 |
| 2007/0226523 A1 * | 9/2007 | Chang | ................ | G11B 19/2009 713/300 |
| 2012/0117409 A1 * | 5/2012 | Lee | ........... | G06F 1/26 713/340 |
| 2014/0167510 A1 * | 6/2014 | Xiao | ........ | H02J 4/00 307/39 |
| 2016/0182039 A1 * | 6/2016 | Xiao | ...... | H03K 17/18 307/115 |

FOREIGN PATENT DOCUMENTS

WO     EP 0632393 A1 *   1/1995  ......... G06F 13/4081

* cited by examiner

*Primary Examiner* — David E Martinez
(74) *Attorney, Agent, or Firm* — Steven Reiss

(57) ABSTRACT

A hot swap system applied in an electronic device includes a plurality of expansion cards and a plurality of electronic components coupled to the expansion cards. Each of the expansion cards includes an expansion chip, a time delay unit, and a switch unit. The time delay unit is electrically coupled to the expansion chip, and outputs a delay signal to the expansion chip to control the expansion chip not operate within a preset time. The switch unit can operate and transmit signal between the corresponding expansion card and the plurality of electronic components after preset time. Therefore, the hot swap system can operate normally, even when one of the expansion cards is inserted suddenly.

14 Claims, 3 Drawing Sheets

HOT SWAP SYSTEM AND ELECTRONIC DEVICE UTILIZING THE SAME

FIELD

The subject matter herein generally relates to an electronic device and particular to a hot swap system thereon.

BACKGROUND

A hot swap system on a motherboard cannot operate normally, when one of a plurality of expansion cards of hot swap system is inserted to the motherboard suddenly.

BRIEF DESCRIPTION OF THE DRAWINGS

Implementations of the present technology will now be described, by way of example only, with reference to the attached figures.

DETAILED DESCRIPTION

Figure 1:
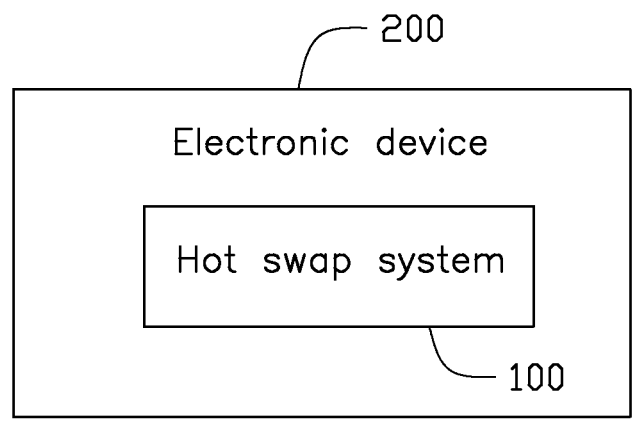
FIG. 1 is a block diagram of an electronic device with a hot swap system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently coupled or releasably coupled. The term "comprising," when utilized, means "including, but not necessarily limited to"; it specifically indicates open-ended inclusion or membership in the so-described combination, group, series and the like.

The disclosure will now be described in relation to an electronic device.

FIG. 1 illustrates a block diagram of an electronic device 200 comprising a hot swap system 100. In the embodiment, the electronic device 200 can be a server.

Figure 2:
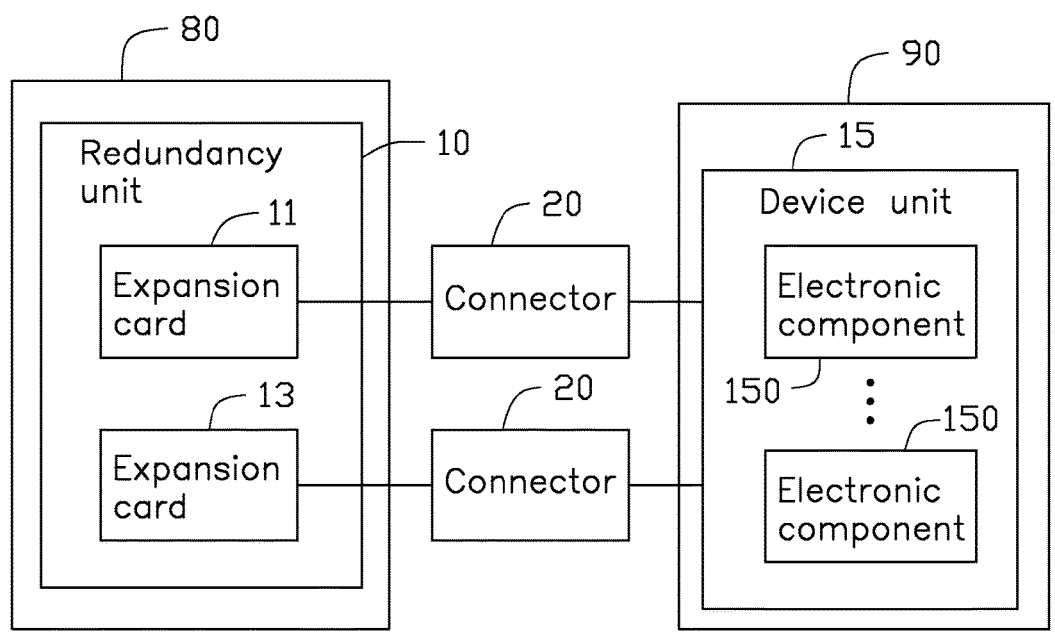
FIG. 2 is a block diagram of the hot swap system of FIG. 1.

FIG. 2 illustrates a block diagram of the hot swap system 100 comprising a redundancy unit 10 and a device unit 15. The redundancy unit 10 can comprise first and second expansion cards 11 and 13. Each of the expansion cards 11 and 13 is electrically coupled to the device unit 15 through an inter integrated circuit (I2C) cable and a corresponding connector 20. The device unit 15 can comprise a plurality of electronic components 150, such as sensors, which transmit signal through the I2C cable. In at least one embodiment, the redundancy unit 10 is set on a motherboard 80, and the device unit 15 is set on a backboard 90.

Figure 3:
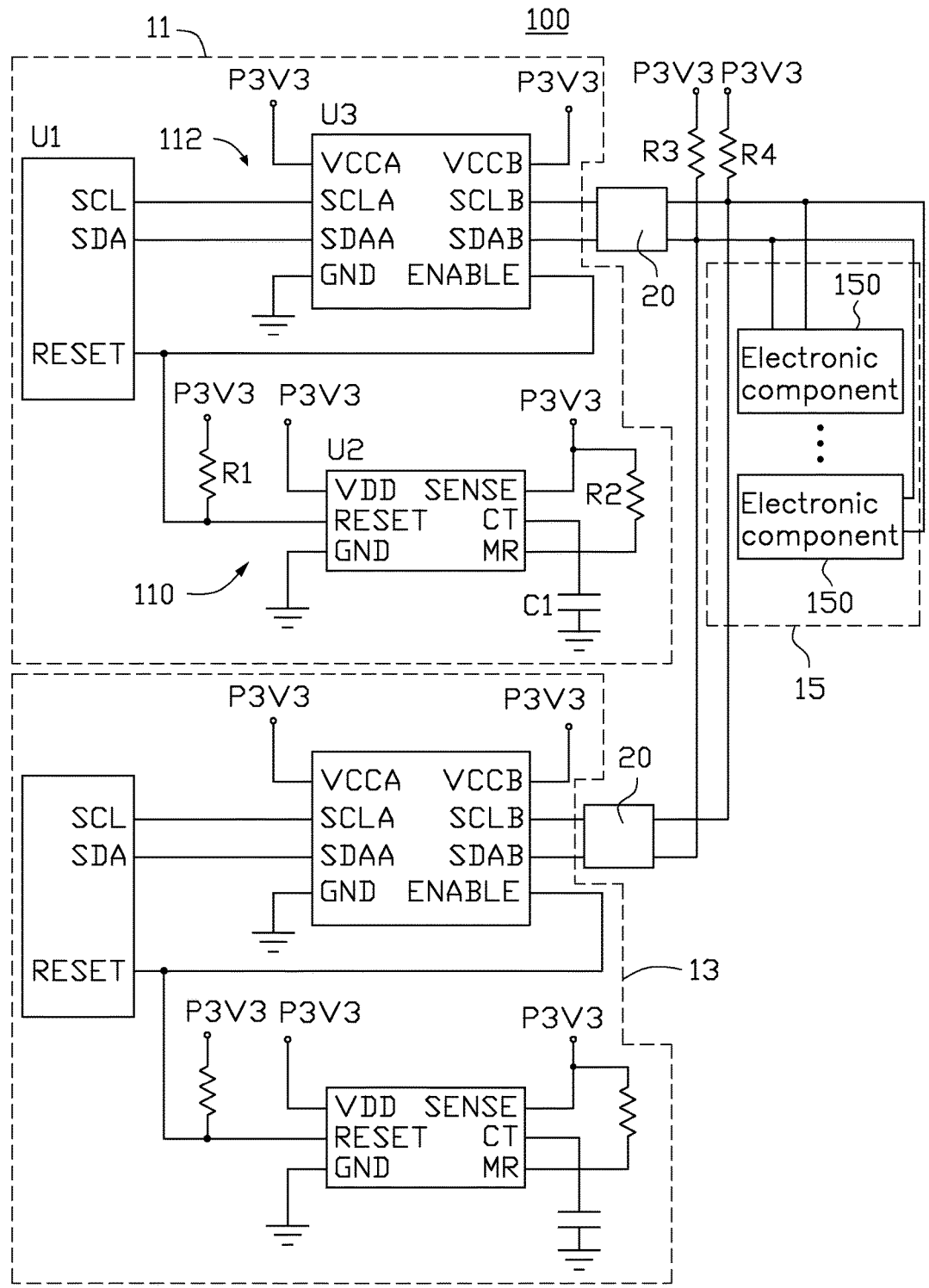
FIG. 3 is a circuit diagram of the hot swap system of FIG. 2.

FIG. 3 illustrates a circuit diagram of the hot swap system 100. The first expansion card 11 can comprise an expansion chip U1, a time delay unit 110, and a switch unit 112. The expansion chip U1 comprises a clear pin SCL, a data pin SDA, and a reset pin RESET. The time delay unit 110 can comprise a delay chip U2, resistors R1 and R2, and a capacitor C1. The switch unit 112 can comprise a switch control chip U3. The delay chip U2 comprises a reset pin PERET, a voltage pin VDD, a sense pin SENSE, a time pin CT, a manual reset pin MR, and a ground pin GND. The switch control chip U3 comprises voltage pins VCCA and VCCB, a ground pin GND, an enable pin, clear pins SCLA and SCLB, data pins SDAA and SDAB. A type of the delay chip U2 is TPS3808.

The reset pin PERET of the delay chip U2 is electrically coupled to a power supply P3V3, and is electrically coupled to the reset pin RESET of the expansion chip U1. The voltage pin VDD of the delay chip U2 is electrically coupled to the power supply P3V3. The sense pin SENSE of the delay chip U2 is electrically coupled to the power supply P3V3. The time pin CT of the delay chip U2 is grounded through the capacitor C1. The manual reset pin MR of the delay chip U2 is electrically coupled to the power source through the resistor R2. The ground pin GND of the delay chip U2 is grounded. The voltage pins VCCA and VCCB of the switch control chip U3 are electrically coupled to the power supply P3V3. The ground pin GND of the expansion chip U3 is grounded. The enable pin ENABLE of the switch control chip U3 is electrically coupled to the reset pin RESET of the expansion chip U1. The clear pin SCLA and the data pin SDAA of the switch control chip U3 are respectively electrically coupled to the clear pin SCL and the data pin SDA of the expansion chip U1, through an I2C cable. The clear pins SCLB and the data pin SDAB of the switch control chip U3 are electrically coupled to the plurality of electronic components 150, through the I2C cable and the corresponding connector 20. The clear pins SCLB and the data pin SDAB of the switch control chip U3 are also electrically coupled to resistors R3 and R4. A type of the switch control chip U3 is PCA9517.

In at least one embodiment, the circuit structure of the first expansion card 11 is the same as that of the second expansion card 13. The connection relationship between the first expansion card 11 and the plurality of electronic components 150 is the same as that of second expansion card 13 and the plurality of electronic components 150.

In use, when the first expansion card 11 is inserted into the motherboard 80, the reset pin RESET of the delay chip U2 outputs a digital low level signal, such as logic "0", to the reset pin RESET of the expansion chip U1 within a preset time, such as 2.6 seconds. The expansion chip U1 is reset, and the switch control chip U3 cannot operate. After the preset time, the expansion chip U1 starts to operate, and outputs an enable signal to the enable pin of the switch control chip through the reset pin. The switch control chip U3 is turned on. The switch control chip U3 can transmit signal from clear pin SCL and the data pin SDA of the expansion chip U1 to the electronic components 150, or transmit signal from the electronic components 150 to the clear pin SCL and the data pin SDA of the expansion chip U1, through the clear pins SCLA, SCLB and the data pins SDAA, SDAB. Therefore, the first expansion card 11 can transmit signal with the electronic components 150. In at least one embodiment, the working principle between the first expansion card 11 and the plurality of electronic components 150 is the same as that of second expansion card 13 and the plurality of electronic components 150.

When the second expansion card 13 is inserted into the motherboard 80, in event that the first expansion card 11 is operating, the expansion card 13 cannot transmit signal with the electronic components 150 within the preset time, which will not break the transmission between the first expansion card 11 and the electronic components 150.

Therefore, the hot swap system can operate normally, even when one of the expansion cards 11 and 13 of the redundancy unit 10 is inserted suddenly.

While the disclosure has been described by way of example and in terms of the embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A hot swap system comprising:
   a plurality of electronic components; and
   a plurality of expansion cards, each one of the expansion cards electrically coupled to one of the electronic components from amongst plurality of electronic components, each one of the expansion cards comprising:
      an expansion chip;
      a time delay unit electrically coupled to the expansion chip, and configured to output a delay signal to the expansion chip, to control the expansion chip not operate within a preset time, wherein the time delay unit can comprise a delay chip, a first resistor, a second resistor, and a capacitor; a reset pin of the delay chip is electrically coupled to a reset pin of the expansion chip, and is electrically coupled to a power supply through the first resistor; a voltage pin of the delay chip is electrically coupled to the power supply; a ground pin of the delay chip is grounded; a sense pin of the delay chip is electrically coupled to the power supply; a time pin of the delay chip is electrically coupled to ground through the first capacitor; and a manual reset pin of the expansion chip is electrically coupled to the power supply through the second resistor; and
      a switch unit electrically coupled to the expansion chip, wherein the switch unit can operate and transmit a signal to the electronic component to which the expansion card is coupled, after preset time.

2. The hot swap system of claim 1, wherein the switch unit can comprise a switch control chip, voltage pins of the switch control chip are electrically coupled to the power supply; a ground pin of the switch control chip is grounded; an enable pin of the switch control chip is electrically coupled to the reset pin of the expansion chip; a first clear pin of the switch control chip is electrically coupled to a clear pin of the expansion chip; a second clear pin of the switch control chip is electrically coupled to the plurality of electronic components; a second data pin of the switch control chip is electrically coupled to a data pin of the expansion chip; and a second data pin of the switch control chip is electrically coupled to the plurality of electronic components.

3. The hot swap system of claim 2, wherein when first expansion chip is inserted, the reset pin of the delay chip outputs a digital low level signal to the reset pin of the first expansion chip, to control the first expansion chip is reset within the preset time; after the preset time, the first expansion chip starts to operate, and the switch control chip is turned on, the switch control chip can transmit signal between the first expansion card and the plurality of electronic components.

4. The hot swap system of claim 3, wherein the second expansion card is inserted, in event that the first expansion card is operating, the second expansion card cannot transmit signal with the plurality of electronic components within the preset time.

5. The hot swap system of claim 4, wherein the switch control chip transmits signal between the corresponding expansion card and the plurality of electronic components through a corresponding inter integrated circuit cable.

6. The hot swap system of claim 1, further comprising a motherboard, a device unit, and a backboard, wherein the plurality of expansion cards are set on the motherboard, and the device unit is set on the backboard.

7. The hot swap system of claim 6, further comprising a plurality of connectors, wherein each of the expansion cards is electrically coupled to the electronic components through a corresponding connector.

8. An electronic device comprising a hot swap system, the hot swap system comprising:
   a plurality of electronic components; and
   a plurality of expansion cards, each of the expansion cards electrically coupled to the plurality of electronic components, and comprising:
      an expansion chip;
      a time delay unit electrically coupled to the expansion chip, and configured to output a delay signal to the expansion chip, to control the expansion chip not operate within a preset time, wherein the time delay unit can comprise a delay chip, a first resistor, a second resistor, and a capacitor; a reset pin of the delay chip is electrically coupled to a reset pin of the expansion chip, and is electrically coupled to a power supply through the first resistor; a voltage pin of the delay chip is electrically coupled to the power supply; a ground pin of the delay chip is grounded; a sense pin of the delay chip is electrically coupled to the power supply; a time pin of the delay chip is electrically coupled to ground through the first capacitor; and a manual reset pin of the expansion chip is electrically coupled to the power supply through the second resistor; and
      a switch unit electrically coupled to the expansion chip, wherein the switch unit can operate and transmit signal between the corresponding expansion card and the plurality of electronic components after preset time.

9. The electronic device of claim 8, wherein the switch unit can comprise a switch control chip, voltage pins of the switch control chip are electrically coupled to the power supply; a ground pin of the switch control chip is grounded; an enable pin of the switch control chip is electrically coupled to the reset pin of the expansion chip; a first clear pin of the switch control chip is electrically coupled to a clear pin of the expansion chip; a second clear pin of the switch control chip is electrically coupled to the plurality of electronic components; a second data pin of the switch control chip is electrically coupled to a data pin of the expansion chip; and a second data pin of the switch control chip is electrically coupled to the plurality of electronic components.

10. The electronic device of claim 9, wherein when first expansion chip is inserted, the reset pin of the delay chip outputs a digital low level signal to the reset pin of the first expansion chip, to control the first expansion chip is reset within the preset time; after the preset time, the first expansion chip starts to operate, and the switch control chip is turned on, the switch control chip can transmit signal between the first expansion card and the plurality of electronic components.

11. The electronic device of claim 10, wherein the second expansion card is inserted, in event that the first expansion card is operating, the second expansion card cannot transmit signal with the plurality of electronic components within the preset time.

12. The electronic device of claim 11, wherein the switch control chip transmits signal between the corresponding expansion card and the plurality of electronic components through a corresponding inter integrated circuit cable.

13. The electronic device of claim 8, further comprising a motherboard, a device unit, and a backboard, wherein the plurality of expansion cards are set on the motherboard, and the device unit is set on the backboard.

14. The electronic device of claim 13, further comprising a plurality of connectors, wherein each of the expansion cards is electrically coupled to the electronic components through a corresponding connector.

* * * * *